United States Patent Office 2,848,984
Patented Aug. 26, 1958

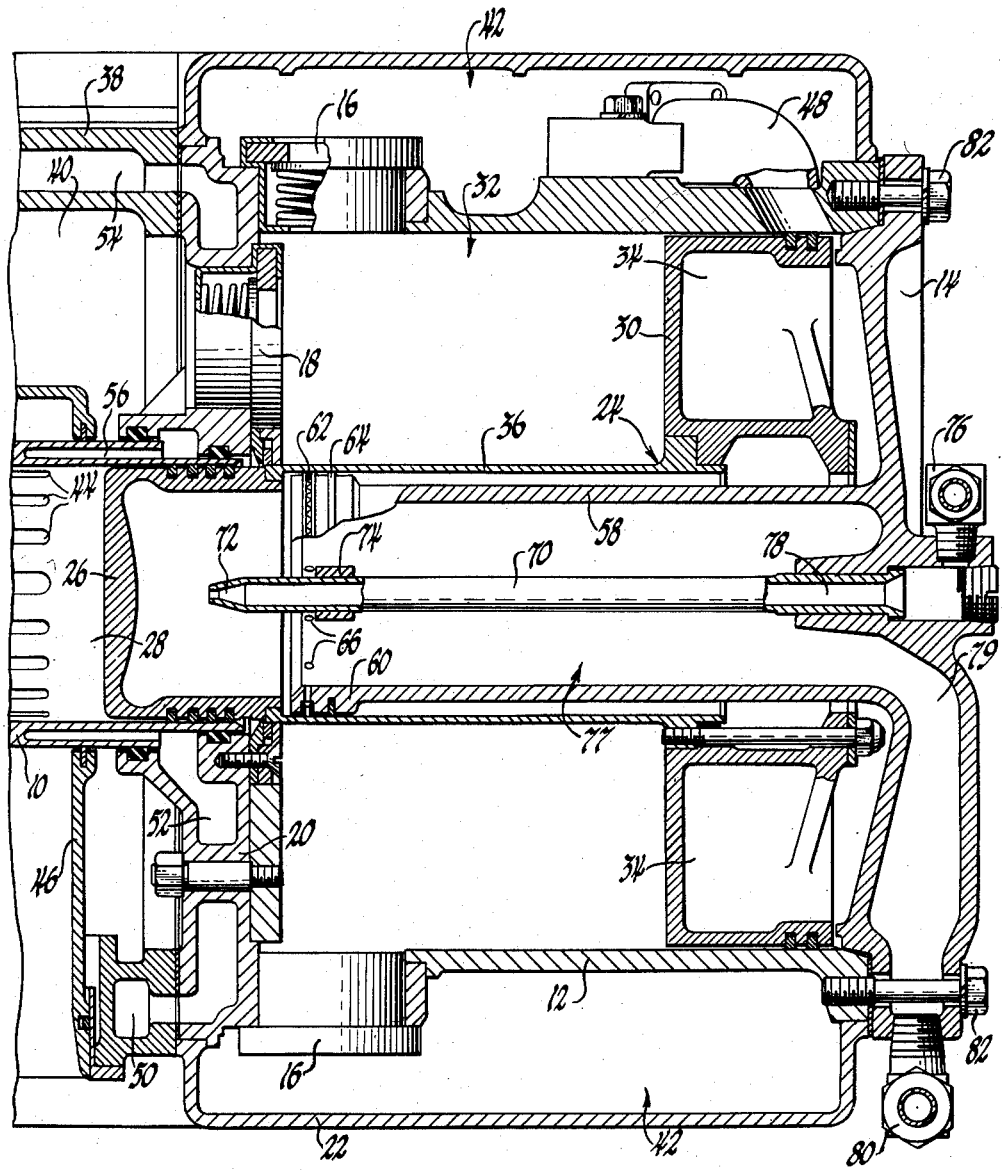

2,848,984

OIL COOLING ARRANGEMENT FOR FREE PISTON GASIFIER

Gregory Flynn, Jr., Grosse Pointe Farms, Mich., assignor to General Motors Corporation, Detroit, Mich., a corporation of Delaware Application February 25, 1957, Serial No. 642,198

4 Claims. (Cl. 123—41.35)

This invention relates to free piston engines and more particularly to oil cooling a free piston engine of the inboard compressing type.

Free piston engines of this type are well known and for a detailed understanding reference may be had to the article "Free Piston Generators" by G. Eichelberg, Schweizerische Bauzeitung, December 4, 1948, pp. 661–667, 673–679. The invention is particularly concerned with simplifying and improving the oil cooling and structural arrangement of the diesel-compressor piston of the GS–34 free piston gasifier described in the article.

Figure 1 is a longitudinal section through the right-hand portion of a free piston engine illustrating the invention. The right and left-hand portions of the engine are substantially similar and only the right-hand portion is shown as the invention may be similarly applied to the left-hand portion.

The engine comprises an outer case which includes a centrally located diesel cylinder 10, a compressor cylinder 12 at each end thereof, a cushion head 14 at the outer ends of the compressor cylinders, air intake valves 16 for the compressor cylinders, compressed air discharge valves 18 for the compressor cylinders mounted in discharge valve plates 20, air intake manifolds 22 surrounding the compressor cylinders, and a pair of diesel-compressor piston assemblies 24 reciprocably received in the diesel and compressor cylinders.

The piston assembly 24 includes a hollow diesel piston 26 which forms a diesel combustion chamber 28 with the diesel cylinder 10, an annular compressor piston 30 which forms a compressor chamber 32 and a bounce or cushion chamber 34 with the discharge valve plate 20, the compressor cylinder 12 and the cushion head 14, and an annular piston skirt 36 which interconnects the diesel and compressor pistons. A cylindrical jacket 38 encircles the diesel cylinder 10 to form a compressed air scavenge chamber 40.

In operation, outward motion of the piston assembly resulting from combustion in the diesel combustion chamber 28 will charge the compressor chamber 32 with atmospheric air from the intake air manifold chamber 42 of the intake valves 16 and will compress trapped air in the bounce or cushion chamber 34. Exhaust ports 44 in the diesel cylinder are uncovered as the piston assembly moves to O. D. P. (outer dead point) to discharge the diesel exhaust gas to a turbine or other user device by way of air exhaust collector manifold 46. The trapped air in the cushion chamber 34 thereupon moves the piston assembly inwardly to I. D. P. (inner dead point) compressing air in the compressor chamber 32 and transferring it through the discharge valves 18 into the compressed air scavenge chamber 40. After diesel ignition occurs the diesel combustion chamber 28 is supplied with compressed air from the scavenge chamber 40 at O. D. P. by intake ports (not shown) in the left end of the diesel cylinder 10.

The engine is provided with other conventional apparatus such as a pressure regulating connection (not shown) between the scavenge chamber and cushion chambers, fuel injectors and synchronizing gear (not shown), a starting air connection 48 for the bounce chamber 34, and cooling water passages 50, 52, 54 and 56 for the central portion of the engine.

The invention is particularly concerned with cooling the interior of the piston assembly 24 and for this purpose the cushion head 14 is provided with a central tube 58 which is cantilevered therefrom to project through the compressor piston 30 and into the interior of the piston skirt 36. The outer diameter of the free end 60 of the cushion head tube 58 is slidable in the inner diameter of the piston skirt 36 and has ring grooves formed therein which receive an oil control scraper ring 62 and a compression ring 64, oil discharge ports 66 being provided through the end of the tube 58 to drain oil from the scraper ring groove. The cushion head 14 also mounts an oil spray pipe 70 in projecting relation which passes through the center of the cushion head tube 58 and which terminates in a nozzle 72 adjacent the hollow side of the diesel piston 26. A radial bracket 74 may be provided between the tube 58 and pipe 70 to provide end support therefor. A pipe coupling 76 supplies a continuous flow of oil to the passage 78 formed by the oil spray pipe 70 and the nozzle 72 sprays the interior of the diesel piston 26 during engine operation. Reciprocation of the piston assembly sloshes and dashes the cooling oil in the rather large annular chamber 77 formed by the interior of the piston assembly and cushion head tube 58. An oil discharge passage 79 extends downwardly in the lower half of the cushion head 14 and is in communication with the slosh chamber 77 to discharge oil therefrom by way of an exhaust pipe coupling 80.

In addition to its simplicity, the oil cooling arrangement provides numerous other advantages. The cushion head 14 is removably mounted on the compressor cylinder 12 by a ring of bolts 82 so that access may be easily had to the piston assembly for periodic inspection and ring changes for the oil spray pipe 70 is removed as a unit with the cushion head without disturbing the piston assembly. As in prior constructions, the piston assembly 24 is externally supported at either end on the diesel and compressor cylinders but the arrangement provides an additional and internal support for the central portion of the piston assembly, that is, where the end 60 of the cantilever tube 58 slidably engages the piston skirt 36. The oil discharge pipe coupling 80 drains to a reservoir (not shown) which is under a lower pressure (such as atmospheric) than any pressure that is produced in the cushion chamber 34 during engine operation so that any air leakage past the rings 62 and 64 will be from the cushion chamber 34 to the oil slosh chamber 76 thus minimizing oil leakage past the rings.

The preferred embodiment of the invention has been described fully in order to explain the principles of the invention. It is to be understood that modifications of structure may be made by the exercise of skill in the art within the scope of the invention which is not to be regarded as limited by the detailed description of the preferred embodiment.

I claim:

1. A liquid cooling arrangement for a free piston engine comprising a compressor cylinder, a diesel cylinder of substantially smaller diameter than the compressor cylinder and located at one end of the compressor cylinder, an annular compressor piston in the compressor cylinder, a hollow diesel piston in the diesel cylinder, an annular piston skirt interconnecting the pistons, a cushion head closing off the other end of the compressor cylinder to form a cushion chamber for the engine, a tube cantilevered from the cushion head projecting through the compressor piston and into the piston skirt, the outer diameter of the free end of the tube being slidable in the inner diameter of the piston skirt and having ring grooves formed therein, piston rings in the ring grooves of the tube engaging the inner diameter of the piston skirt, liquid coolant supply means, coolant discharge means, and a coolant spray pipe spaced in the tube having a nozzle portion at one end directed at the hollow side of the diesel piston and having a connection with the liquid coolant supply means at the other end, the liquid coolant discharge means communicating with the space between the spray pipe and the tube to drain said space.

2. A liquid cooling arrangement for a free piston engine comprising a compressor cylinder, a diesel cylinder of substantially smaller diameter than the compressor cylinder and located at one end of the compressor cylinder, an annular compressor piston in the compressor cylinder, a hollow diesel piston in the diesel cylinder, an annular piston skirt interconnecting the pistons, a cushion head closing off the other end of the compressor cylinder to form a cushion chamber for the engine, a tube cantilevered from the cushion head projecting through the compressor piston and into the piston skirt, the outer diameter of the free end of the tube being slidable in the inner diameter of the piston skirt and having ring grooves formed therein, piston rings in the ring grooves of the tube engaging the inner diameter of the piston skirt, liquid supply means, liquid discharge means, and a liquid spray pipe spaced in the tube having a nozzle portion at one end directed at the hollow side of the diesel piston and having a connection with the liquid supply means at the other end, the liquid discharge means communicating with the space between the liquid spray pipe and the tube to drain said space, the exit pressure of the liquid discharge means being substantially lower than the cushion chamber pressures during engine operation so that liquid leakage past the piston rings and into the cushion chamber is minimized.

3. An oil cooling arrangement for a free piston engine comprising a compressor cylinder, a diesel cylinder of substantially smaller diameter than the compressor cylinder and located at one end of the compressor cylinder, an annular compressor piston in the compressor cylinder, a hollow diesel piston in the diesel cylinder, an annular piston skirt interconnecting the pistons, a cushion head closing off the other end of the compressor cylinder to form a cushion chamber for the engine, a tube cantilevered from the cushion head projecting through the compressor piston and into the piston skirt, the outer diameter of the free end of the tube being slidable in the inner diameter of the piston skirt and having a pair of axially spaced ring grooves formed therein, piston rings in the ring grooves of the tube engaging the inner diameter of the piston skirt, oil supply means, oil discharge means, and an oil spray pipe spaced in the tube having a nozzle portion at one end directed at the hollow side of the diesel piston and having a connection with the oil supply means at the other end, the oil discharge means communicating with the space between the oil spray pipe and the tube to drain said space.

4. An oil cooling arrangement for a free piston engine comprising a compressor cylinder, a diesel cylinder of substantially smaller diameter than the compressor cylinder and located at one end of the compressor cylinder, an annular compressor piston in the compressor cylinder, a hollow diesel piston in the diesel cylinder, an annular piston skirt interconnecting the pistons, a removable cushion head closing off the other end of the compressor cylinder to form a cushion chamber for the engine, a tube cantilevered from the cushion head projecting through the compressor piston and into the piston skirt to locate the axis of the cushion head coaxially with the axis of the piston skirt, the outer diameter of the free end of the tube being slidable in the inner diameter of the piston skirt and having ring grooves formed therein, piston rings in the ring grooves of the tube engaging the inner diameter of the piston skirt, oil supply means, oil discharge means, and an oil spray pipe spaced in the tube having a nozzle portion at one end directed at the hollow side of the diesel piston and having a connection with the oil supply means at the other end, the oil discharge means communicating with the space between the oil spray pipe and the tube to drain said space.

References Cited in the file of this patent

FOREIGN PATENTS 405,814　　Great Britain _____ Feb. 15, 1934